US012807748B2

(12) United States Patent
Kamiya et al.

(10) Patent No.: US 12,807,748 B2
(45) Date of Patent: Nov. 24, 2026

(54) COMPRESSED MEMBER FOR ELECTROCHEMICAL DEVICE

(71) Applicant: DAIKIN INDUSTRIES, LTD., Osaka (JP)

(72) Inventors: Yusuke Kamiya, Osaka (JP); Takahiro Furutani, Osaka (JP); Kouhei Takemura, Osaka (JP); Keisuke Shiomi, Osaka (JP); Masaki Irie, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 1197 days.

(21) Appl. No.: 17/596,553

(22) PCT Filed: Jun. 15, 2020

(86) PCT No.: PCT/JP2020/023418

§ 371 (c)(1),
(2) Date: Dec. 13, 2021

(87) PCT Pub. No.: WO2020/251056

PCT Pub. Date: Dec. 17, 2020

(65) Prior Publication Data

US 2022/0251262 A1 Aug. 11, 2022

(30) Foreign Application Priority Data

Jun. 14, 2019 (JP) ................................ 2019-111156

(51) Int. Cl.
*C08F 214/22* (2006.01)
*C08J 3/24* (2006.01)
*H01M 50/193* (2021.01)

(52) U.S. Cl.
CPC ............ *C08F 214/222* (2013.01); *C08J 3/24* (2013.01); *H01M 50/193* (2021.01); *C08J 2327/16* (2013.01)

(58) Field of Classification Search
CPC ...... C08F 214/222; C08F 214/22; C08F 2/44; H01M 50/193; H01M 50/186; H01M 50/183; C08J 3/24; C08J 2327/16; Y02E 60/10; C08K 3/04; C08K 5/14; C08K 5/34924; C08K 5/0025; C09K 3/1009; C09K 3/1006; C09K 2003/1053; C09K 2003/1068; C09K 2200/0208; C09K 2200/0464; C09K 2200/0637; C08L 27/12
USPC ........................................................ 526/247
See application file for complete search history.

(56) References Cited

U.S. PATENT DOCUMENTS 5,585,449 A 12/1996 Arcella et al.
9,976,016 B2 5/2018 Ota et al.
2012/0077924 A1* 3/2012 Ota .......................... C08K 3/04 524/495
2012/0077925 A1 3/2012 Terada et al.
2012/0077927 A1 3/2012 Ota et al.
2013/0225758 A1 8/2013 Yano et al.
2013/0280490 A1 10/2013 Takemura et al.
2014/0378616 A1 12/2014 Nakano et al.
2015/0031822 A1* 1/2015 Ota .......................... C08K 3/04 524/545
2016/0006004 A1 1/2016 Ogawa et al.

FOREIGN PATENT DOCUMENTS

CN 103080217 A * 5/2013 .............. C08K 5/14
EP 2 264 100 A1 12/2010
EP 2 610 533 A1 7/2013
JP 60-62058 A 4/1985
JP 9-78054 A 3/1997
JP 2001-139797 A 5/2001
JP 2001-202935 A 7/2001
JP 2008-007671 A 1/2008
JP 2008-235081 A 10/2008
JP 2009-252719 A 10/2009
JP 2011-029167 A 2/2011
JP 2014-056675 A 3/2014
JP 2015-510519 A 4/2015
JP 2016-004668 A 1/2016
WO 2009/119409 A1 10/2009
WO 2012/026553 A1 3/2012
WO 2012/026557 A1 3/2012

(Continued)

OTHER PUBLICATIONS

International Preliminary Report on Patentability dated Dec. 14, 2021 with a Translation of the Written Opinion of the International Searching Authority in Application No. PCT/JP2020/023418.
Extended European Search Report issued May 9, 2023 in European Application No. 20822849.4.
International Search Report for PCT/JP2020/023418 dated, Sep. 1, 2020 (PCT/ISA/210).

*Primary Examiner* — Kumar R Bhushan
(74) *Attorney, Agent, or Firm* — Sughrue Mion, PLLC

(57) ABSTRACT

Provided is a member to be compressed for an electrochemical device obtained by crosslinking a crosslinkable composition containing a fluorine-containing elastomer, wherein the fluorine-containing elastomer exhibits a difference δG' (G'(100° C.)−G'(180° C.)) between the storage elastic modulus G'(100° C.) at a measurement temperature of 100° C. and the storage elastic modulus G'(180° C.) at a measurement temperature of 180° C., in the dynamic viscoelasticity test (strain amplitude: 0.5 Deg; frequency: 100 CPM) with a rubber process analyzer satisfying the following conditions:

$$40\ \text{kPa} < \delta G' < 175\ \text{kPa}.$$

6 Claims, No Drawings

(56) References Cited

FOREIGN PATENT DOCUMENTS

| | | | |
|---|---|---|---|
| WO | 2012/093624 | A1 | 7/2012 |
| WO | 2013/046933 | A1 | 4/2013 |
| WO | 2013/115374 | A1 | 8/2013 |
| WO | 2013/125735 | A1 | 8/2013 |
| WO | 2014/103813 | A1 | 7/2014 |
| WO | 2014/129413 | A1 | 8/2014 |
| WO | 2018/213671 | A1 | 11/2018 |

* cited by examiner

COMPRESSED MEMBER FOR ELECTROCHEMICAL DEVICE

CROSS REFERENCE TO RELATED APPLICATIONS

This application is a National Stage of International Application No. PCT/JP2020/023418 filed on Jun. 15, 2020, claiming priority based on Japanese Patent Application No. 2019-111156 filed Jun. 14, 2019.

TECHNICAL FIELD

The present disclosure relates to a member to be compressed for an electrochemical device.

BACKGROUND ART

Patent Document 1 describes a sealed battery comprising: a battery case with a through hole; a gasket having a through hole and fitted so as to face the battery case; and a rivet provided so as to penetrate through the through hole of the battery case and the through hole of the gasket from the inside of the battery case. This gasket can be an elastic member, having insulating properties, made of a fluoroelastomer (such as a tetrafluoroethylene-perfluoroalkyl vinyl ether copolymer (PFA), a vinylidene fluoride-based polymer (FKM), and a tetrafluoroethylene-propylene-based copolymer (FEPM)), an ethylene-propylene rubber (EPM), an ethylene-propylene-diene copolymer rubber (EPDM), or a butyl rubber or the like.

RELATED ART

Patent Documents

Patent Document 1: Japanese Patent Laid-Open No. 2016-4668

SUMMARY OF THE INVENTION

Problem to be Solved by the Invention

An object of the present disclosure is to provide a member to be compressed for an electrochemical device that is excellent in sealing properties and releasability at the time of molding.

Means for Solving the Problem

The present disclosure provides a member to be compressed for an electrochemical device obtained by crosslinking a crosslinkable composition containing a fluorine-containing elastomer, wherein the fluorine-containing elastomer exhibits a difference δG' (G'(100° C.)–G'(180° C.)) between the storage elastic modulus G' (100° C.) at a measurement temperature of 100° C. and the storage elastic modulus G'(180° C.) at a measurement temperature of 180° C., in the dynamic viscoelasticity test (strain amplitude: 0.5 Deg; frequency: 100 CPM) with a rubber process analyzer satisfying the following conditions:

$$40\ kPa<\delta G'<175\ kPa.$$

In the member to be compressed for an electrochemical device of the present disclosure, the fluorine-containing elastomer preferably contains a vinylidene fluoride unit and a perfluoro(alkylvinylether) unit.

The perfluoro(alkylvinylether) unit in the fluorine-containing elastomer is preferably a polymerized unit derived from at least one monomer selected from the group consisting of a perfluoro(alkylvinylether) represented by the general formula (1):

$$CF_2{=}CFORf^1$$

wherein $Rf^1$ represents a perfluoroalkyl group having 1 to 8 carbon atoms; and a perfluoro(alkoxyalkylvinylether) represented by the general formula (2):

$$CF_2{=}CF(ORf^2)_{k1}ORf^3$$

wherein $Rf^2$ represents a perfluoroalkylene group having 1 to 6 carbon atoms, $Rf^3$ represents a perfluoroalkyl group having 1 to 8 carbon atoms or a cyclic perfluoroalkyl group having 5 or 6 carbon atoms, and k1 represents an integer from 1 to 3.

In the member to be compressed for an electrochemical device of the present disclosure, the crosslinkable composition preferably further contains a peroxide cross-linking agent.

The member to be compressed for an electrochemical device of the present disclosure can be suitably used as a member to be compressed for a non-aqueous electrolyte secondary battery.

The member to be compressed for an electrochemical device of the present disclosure can be also suitably used as a sealing member or an insulating member.

Effects of Invention

The present disclosure can provide a member to be compressed for an electrochemical device that is excellent in sealing properties and releasability at the time of molding.

DESCRIPTION OF EMBODIMENTS

Hereinafter, the present disclosure will be described in detail with respect to specific embodiments, but the present disclosure is not limited to the following embodiments.

The member to be compressed for an electrochemical device of the present disclosure is a member used by compressing to deform it. The present inventors have found that the member to be compressed formed from a fluorine-containing elastomer exhibiting a difference δG' between the storage elastic moduli within an extremely limited range is excellent in sealing properties and releasability at the time of molding and is suitable as a member to be compressed used in an electrochemical device, and they have completed the member to be compressed for an electrochemical device of the present disclosure.

The member to be compressed for an electrochemical device of the present disclosure is obtained by crosslinking a crosslinkable composition containing a fluorine-containing elastomer, and the fluorine-containing elastomer exhibits a difference δG' (G'(100° C.)–G'(180° C.)) between the storage elastic modulus G'(100° C.) at a measurement temperature of 100° C. and the storage elastic modulus G'(180° C.) at a measurement temperature of 180° C., in the dynamic viscoelasticity test (strain amplitude: 0.5 Deg; frequency: 100 CPM) with a rubber process analyzer satisfying the following conditions:

$$40\ kPa<\delta G'<175\ kPa.$$

Each of the storage elastic modulus G'(100° C.) and the storage elastic modulus G'(180° C.) is calculated by the dynamic viscoelasticity test (strain amplitude: 0.5 Deg;

frequency: 100 CPM) with a rubber process analyzer (model: RPA2000), manufactured by Alpha Technologies Ltd, in accordance with ASTM D6204.

A difference δG' (G'(100° C.)−G'(180° C.)) between the storage elastic modulus G'(100° C.) and the storage elastic modulus G'(180° C.) is more than 40 kPa and less than 175 kPa, preferably more than 50 kPa, more preferably more than 70 kP and still more preferably more than 80 kPa, and preferably less than 165 kPa, more preferably less than 155 kPa and still more preferably less than 145 kPa.

The storage elastic modulus G'(100° C.) is preferably 300 kPa or less, more preferably 280 kPa or less and still more preferably 260 kPa or less, and preferably 80 kPa or more and more preferably 100 kPa or more.

The fluorine-containing elastomer to be used in the present disclosure is an amorphous fluoropolymer. The term "amorphous" means that the fluoropolymer has a melting peak (ΔH) of 4.5 J/g or less as measured in differential scanning calorimetry [DSC] (at a heating rate of 20° C./min) or differential thermal analysis [DTA] (at a heating rate of 10° C./min). The fluorine-containing elastomer, when cross-linked, exhibits elastomeric properties. The term "elastomeric properties" refers to the properties that the polymer can be stretched and retain its original length when the forces required to stretch the polymer are no longer applied.

The fluorine-containing elastomer is preferably a fluorine-containing elastomer containing a vinylidene fluoride (VdF) unit and a perfluoro(alkylvinylether) (PAVE) unit. The difference δG' can be adjusted within the above range by adjusting the type and content of the PAVE unit. The fluorine-containing elastomer containing the VdF unit and the PAVE unit is also excellent in low-temperature resistance. Therefore, the member to be compressed for an electrochemical device containing the fluorine-containing elastomer containing the VdF unit and the PAVE unit is low in compression set at a low temperature (such as −30° C.) and is excellent in sealing characteristics at a low temperature, and it can be suitably applied to an electrochemical device used in a cold region.

The PAVE from which the PAVE unit is derived is preferably at least one monomer selected from the group consisting of a perfluoro(alkylvinylether) represented by the general formula (1):

$$CF_2{=}CFORf^1$$

wherein $Rf^1$ represents a perfluoroalkyl group having 1 to 8 carbon atoms; and a perfluoro(alkoxyalkylvinylether) represented by the general formula (2):

$$CF_2{=}CF(ORf^2)_{k1}ORf^3$$

wherein $Rf^2$ represents a perfluoroalkylene group having 1 to 6 carbon atoms, $Rf^3$ represents a perfluoroalkyl group having 1 to 8 carbon atoms or a cyclic perfluoroalkyl group having 5 or 6 carbon atoms, and k1 represents an integer from 1 to 3.

In the general formula (1), $Rf^1$ is a perfluoroalkyl group having 1 to 8 carbon atoms. $Rf^1$ preferably has 1 to 4 carbon atoms and more preferably 1 to 3 carbon atoms. The perfluoroalkyl group represented by $Rf^1$ may be linear or branched.

The perfluoro(alkylvinylether) represented by the general formula (1) is preferably at least one selected from the group consisting of perfluoro(methylvinylether) (PMVE), perfluoro(ethylvinylether) (PEVE) and perfluoro(propylvinylether) (PPVE), and more preferably PMVE.

In the general formula (2), $Rf^2$ is a perfluoroalkylene group having 1 to 6 carbon atoms. $Rf^2$ preferably has 1 to 4 carbon atoms and more preferably 1 to 3 carbon atoms. The perfluoroalkylene group represented by $Rf^2$ may be linear or branched.

In the general formula (2), $Rf^3$ is a perfluoroalkyl group having 1 to 8 carbon atoms or a cyclic fluoroalkyl group having 5 or 6 carbon atoms, and preferably a perfluoroalkyl group having 1 to 8 carbon atoms. The perfluoroalkyl group represented by $Rf^3$ preferably has 1 to 4 carbon atoms and more preferably 1 to 3 carbon atoms. The perfluoroalkyl group represented by $Rf^3$ may be linear or branched.

In the general formula (2), k1 is an integer of 1 to 3, preferably 1 or 2, and more preferably 1. If k1 is 2 or 3, each $Rf^2$ is the same or different.

The perfluoro(alkoxyalkylvinylether) represented by the general formula (2) is preferably at least one selected from the group consisting of a perfluoro(alkoxyalkylvinylether) represented by each of the formulae: $CF_2{=}CFOCF_2ORf^3$, $CF_2{=}CFOCF_2OCF_2CF_2ORF^3$, $CF_2{=}CFOC_2CF_2ORf^3$, $CF_2{=}CFOCF_2CF_2CF_2ORf^3$, $CF_2{=}CFOCF_2CF_2(CF_3)ORf^3$ and $CF_2{=}CFOCF_2OCF_2CF_2ORf^3$ wherein $Rf^3$ is as described above, and more preferably at least one selected from the group consisting of $CF_2{=}CFOCF_2OCF_2CF_3$, $CF_2{=}CFOCF_2OCF_2CF_2OCF_3$, $CF_2{=}CFOCF_2OCF_3$, $CF_2{=}CFOCF_2CF_2CF_2OCF_3$ and $CF_2{=}CFOCF_2CF(CF_3)OCF_3$.

The fluorine-containing elastomer containing the VdF and PAVE units preferably contains 30 to 90 mol % of the VdF unit and 70 to 10 mol % of the PAVE unit, more preferably 40 to 85 mol % of the VdF unit and 60 to 15 mol % of the PAVE unit, and still more preferably 50 to 85 mol % of the VdF unit and 50 to 15 mol % of the PAVE unit.

The fluorine-containing elastomer containing the VdF and PAVE units may contain a polymerized unit derived from a monomer copolymerizable with VdF and PAVE. The content of the polymerized unit derived from the copolymerizable monomer is preferably 0 to 35 mol %, more preferably 3 to 30 mol % and still more preferably 5 to 30 mol %, based on the total amount of the VdF and PAVE units.

Examples of the monomer copolymerizable with VdF and PAVE include a fluorine-containing ethylenic monomer and a non-fluorinated monomer, and a fluorine-containing ethylenic monomer is preferred.

Examples of the fluorine-containing ethylenic monomer include tetrafluoroethylene (TFE), hexafluoropropylene (HFP), fluoroalkyl vinyl ether, perfluoro(alkylallylether), fluoroalkylallyl ether, chlorotrifluoroethylene (CTFE), trifluoroethylene, trifluoropropylene, pentafluoropropylene, trifluorobutene, tetrafluoroisobutene, hexafluoroisobutene, vinyl fluoride; a fluoromonomer represented by the general formula: $CHX^1{=}CX^2Rf^{11}$ wherein one of $X^1$ and $X^2$ is H and the other is F, and $Rf^{11}$ is a linear or branched fluoroalkyl group having 1 to 12 carbon atoms; a fluoromonomer represented by the general formula: $CH_2{=}CH{-}(CF_2)_n{-}X^3$ wherein $X^3$ is H or F, and n is an integer of 3 to 10; and a fluorine-containing monomer such as a monomer providing a crosslinking site. Among them, preferred is at least one selected from the group consisting of TFE and HFP, and more preferred is TFE.

Examples of the non-fluorinated monomer include ethylene, propylene and alkyl vinyl ether.

The fluorine-containing elastomer containing the VdF and PAVE units is preferably at least one selected from the group consisting of a VdF/PAVE copolymer, a VdF/TFE/PAVE copolymer, a VdF/HFP/PAVE copolymer and a VdF/HFP/TFE/PAVE copolymer, and more preferably a VdF/TFE/PAVE copolymer.

The VdF/PAVE copolymer preferably has a VdF/PAVE molar ratio of 65 to 90/10 to 35.

The VdF/TFE/PAVE copolymer preferably has a VdF/TFE/PAVE molar ratio of 40 to 80/3 to 40/15 to 35, and more preferably 50 to 80/5 to 30/15 to 25.

The VdF/HFP/PAVE copolymer preferably has a VdF/HFP/PAVE molar ratio of 65 to 90/3 to 25/3 to 25.

The VdF/HFP/TFE/PAVE copolymer preferably has a VdF/HFP/TFE/PAVE molar ratio of 40 to 90/0 to 25/0 to 40/3 to 35, and more preferably 40 to 80/3 to 25/3 to 40/3 to 25.

The fluorine-containing elastomer also preferably contains a polymerized unit derived from a monomer providing a crosslinking site. Examples of the monomer providing a crosslinking site include an iodine-containing monomer such as perfluoro(6,6-dihydro-6-iodo-3-oxa-1-hexene) or perfluoro(5-iodo)-3-oxa-1-pentene) as described in Japanese Patent Publication No. 5-63482 and Japanese Patent Laid-Open No. 7-316234; a bromine-containing monomer as described in Japanese Translation of PCT International Application Publication No. 4-505341; a cyano group-containing monomer as described in Japanese Translation of PCT International Application Publication Nos. 4-505345 and 5-5000070; a carboxyl group-containing monomer; and an alkoxycarbonyl group-containing monomer.

The fluorine-containing elastomer also preferably contains a polymerized derived from a bisolefin monomer. The bisolefin monomer is represented by the general formula:

$$CX^4_2{=}CX^4{-}Z^1{-}CX^4{=}CX^4_2$$

wherein each $X^4$ independently represents H, F, an alkyl group or a fluorinated alkyl group, and $Z^1$ represents an alkylene group, a fluorinated alkylene group, a cycloalkylene group, a fluorinated cycloalkylene group, an oxyalkylene group or a fluorinated oxyalkylene group.

In the above formula, each $X^4$ is independently H, F, an alkyl group or a fluorinated alkyl group. When the alkyl group or fluorinated alkyl group has two or more carbon atoms, it has optionally an oxygen atom between two carbon atoms. The alkyl group or fluorinated alkyl group has optionally an aromatic ring. The alkyl group or fluorinated alkyl group may be linear or branched.

Each $X^4$ is preferably H, F, an alkyl group having 1 to 5 carbon atoms or a fluorinated alkyl group having 1 to 5 carbon atoms, more preferably H, F, $CH_3$ or $CF_3$, still more preferably H or F, and particularly preferably H, because the member to be compressed for an electrochemical device is much better in compression set resistance, electrolyte resistance and also releasability at the time of molding.

$Z^1$ is an alkylene group, a fluorinated alkylene group, a cycloalkylene group, a fluorinated cycloalkylene group, an oxyalkylene group or a fluorinated oxyalkylene group. When each of these groups has two or more carbon atoms, it has optionally an oxygen atom between two carbon atoms. Each of these groups optionally has an aromatic ring. Each of these groups may be linear or branched.

Examples of the bisolefin monomer include $CH_2{=}CH{-}(CF_2)_4{-}CH{=}CH_2$, $CH_2{=}CH{-}(CF_2)_6{-}CH{=}CH_2$, $CF_2{=}CFO(CF_2)_3OCF{=}CF_2$ and $CF_2{=}CFO(CF_2)_4OCF{=}CF_2$.

The monomeric composition of the fluorine-containing elastomer can be measured by $^{19}$F-NMR.

The fluorine-containing elastomer may be obtained by using a chain transfer agent at the time of polymerization. The chain transfer agent may be a bromine compound or an iodine compound. The use of a bromine compound or an iodine compound as a chain transfer agent enables the bromine atom or iodine atom derived from the chain transfer agent to be introduced into the main chain terminal and the side chain terminal of the polymer, which in turn can bring the distance between crosslinking points close to a uniform value. As a result, the obtained member to be compressed for an electrochemical device can be further improved in the sealing properties and releasability at the time of molding. Therefore, the fluorine-containing elastomer preferably has an iodine atom or a bromine atom. Further, the fluorine-containing elastomer is preferably obtained by a polymerization process using a bromine compound or an iodine compound as a chain transfer agent.

Examples of the polymerization process using a bromine compound or an iodine compound include an emulsion polymerization process that is carried out in an aqueous medium in the presence of a bromine compound or an iodine compound in a substantially oxygen-free state under pressure (an iodine transfer polymerization process). Representative examples of the bromine compound or the iodine compound include a compound represented by the general formula:

$$R^2I_xBr_y$$

wherein each of x and y is an integer of 0 to 2 and they satisfy $1 \le x+y \le 2$, and $R^2$ is a saturated or unsaturated fluorohydrocarbon group or chlorofluorohydrocarbon group having 1 to 16 carbon atoms or a hydrocarbon group having 1 to 3 carbon atoms, which optionally contains an oxygen atom. The use of a bromine compound or an iodine compound causes a bromine atom or an iodine to be introduced into a polymer and to function as a crosslinking point.

The total content rate of an iodine atom and a bromine atom in the fluorine-containing elastomer is preferably 0.001% by mass or more, more preferably 0.01% by mass or more and still more preferably 0.1% by mass or more, and preferably 10% by mass or less, more preferably 5% by mass or less and still more preferably 1% by mass or less.

The total content rate of an iodine atom and a bromine atom can be determined using a Shimadzu 20A ion chromatograph, after mixing 12 mg of a fluorine-containing elastomer with 5 mg of $Na_2SO_3$, subjecting it to combustion in oxygen in a quartz flask followed by absorption in an absorbing solution, that is, 30 mg of a mixture of $Na_2CO_3$ and $K_2CO_3$ in a ratio of 1:1 (weight ratio) dissolved in 20 ml of pure water, and then allowing it to stand for 30 minutes. Calibration curves can be prepared using KI standard solutions and KBr standard solutions, solutions containing 0.5 ppm and 1.0 ppm of an iodide ion and a bromine ion.

Examples of the bromine compound and iodine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, CFBrClCFClBr, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1, 2-bromo-4-iodoperfluorobutene-1, monoiodomonobromo-substituted benzene, diiodomonobromo-substituted benzene and 2-iodoethyl-substituted and 2-bromoethyl-substituted benzene. Each of these compounds may be used alone or in combination with each other.

Among these, 1,4-diiodoperfluorobutane, 1,6-diiodoperfluorohexane and 2-iodoperfluoropropane are preferably used, from the viewpoint of polymerization reactivity, crosslinking reactivity, availability and the like.

The glass transition temperature of the fluorine-containing elastomer is preferably −70° C. or more, more preferably −60° C. or more, and still more preferably −50° C. or more, because the member to be compressed for an electrochemical device is excellent in sealing properties at a high temperature. It is also preferably 5° C. or less, more preferably 0° C. or less, still more preferably −3° C. or less, particularly preferably −10° C. or less and most preferably −20° C. or less, because the member to be compressed for an electrochemical device is good in low-temperature resistance. A lower glass transition temperature of the fluorine-containing elastomer tends to make the member to be compressed for the electrochemical device of the present disclosure more excellent in the sealing properties at a low temperature. The member to be compressed for the electrochemical device excellent in the sealing properties at a low temperature can be suitably applied to an electrochemical device used in a cold region.

The glass transition temperature can be determined by using a differential scanning calorimeter (DSC822e, manufactured by Mettler Toledo) and heating 10 mg of a sample at a heating rate of 20° C./min to obtain a DSC curve, and by reading out, as a glass transition temperature, a temperature at the midpoint between two points of intersection between the extended lines of the baselines after and before secondary transition of the DSC curve and the tangent line at the inflection point of the DSC curve.

The Mooney viscosity ML (1+10) of the fluorine-containing elastomer at 121° C. is preferably 10 or more and more preferably 15 or more, and preferably 120 or less and more preferably 100 or less, because the member to be compressed for an electrochemical device is good in heat resistance. Mooney viscosity is measured in accordance with ASTM-D1646 and JIS K6300.

The fluorine-containing elastomer has preferably a number average molecular weight (Mn) of 1,000 to 300,000 and more preferably 10,000 to 200,000. The fluorine-containing elastomer has preferably a molecular weight distribution (weight average molecular weight (Mw)/number average molecular weight (Mn)) of 1.3 or more, more preferably 1.5 or more, and preferably 15 or less and more preferably 12 or less. The number average molecular weight (Mn), the weight average molecular weight (Mw), and Mw/Mn are measured by the GPC method.

The above-described crosslinkable composition preferably contains a fluorine-containing elastomer and a cross-linking agent. The cross-linking agent is not limited as long as it is a cross-linking agent conventionally used in polyamine crosslinking, polyol crosslinking, peroxide cross-linking and the like, but is preferably at least one selected from the group consisting of a polyamine compound, a polyhydroxy compound and a peroxide cross-linking agent, and more preferably a peroxide cross-linking agent.

The peroxide cross-linking agent is preferably an organic peroxide. The organic peroxide may be any organic peroxide that can easily generate a radical in the presence of heat or an oxidation-reduction system. Examples of the organic peroxide can include 1,1-bis(t-butylperoxy)-3,5,5-trimethylcyclohexane, 2,5-dimethylhexane-2,5-dihydroperoxide, di-t-butyl peroxide, t-butyl cumyl peroxide, dicumyl peroxide, α,α-bis(t-butylperoxy)-p-diisopropylbenzene, 2,5-dimethyl-2,5-di(t-butylperoxy)hexane, 2,5-dimethyl-2,5-di(t-butylperoxy)hexyne-3, benzoyl peroxide, t-butylperoxybenzene, t-butyl peroxy maleic acid, t-butylperoxy isopropyl carbonate and t-butylperoxy benzoate. Among them, 2,5-dimethyl-2,5-di(t-butylperoxy)hexane and 2,5-dimethyl-2,5-di(t-butylperoxy)hexyne-3 are preferred.

When the cross-linking agent is an organic peroxide, the crosslinkable composition preferably contains a cross-linking aid. Examples of the cross-linking aid include triallyl cyanurate, trimethallyl isocyanurate, triallyl isocyanurate (TAIC), triacrylformal, triallyl trimellitate, N,N'-m-phenylene bismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine-2,4,6-trione), tris(diallylamine)-s-triazine, triallyl phosphite, N,N-diallylacrylamide, 1,6-divinyldodecafluorohexane, hexaallyl phosphoramide, N,N,N',N'-tetraallylphthalamide, N,N,N',N'-tetraallylnalonamide, trivinyl isocyanurate, 2,4,6-trivinylmethyltrisiloxane, tri(5-norbornene-2-methylene)cyanurate and triallyl phosphite. Among them, triallyl isocyanurate (TAIC) is preferred from the viewpoint of excellent crosslinkability and excellent physical properties of the member to be compressed for an electrochemical device.

The content of the cross-linking agent in the above-described crosslinkable composition is preferably 0.01 to 10 parts by mass and more preferably 0.1 to 5 parts by mass, based on 100 parts by mass of the fluorine-containing elastomer. Too little cross-linking agent results in an insufficient degree of crosslinking which tends to impair the performance of the obtained member to be compressed for an electrochemical device. In contrast, too much cross-linking agent results in too high crosslinking density, which increase a crosslinking time and is economically not preferred.

The formulation amount of the cross-linking aid is preferably 0.01 to 10 parts by mass and more preferably 0.1 to 5.0 parts by mass, based on 100 parts by mass of the fluorine-containing elastomer. Too little cross-linking aid tends to make the crosslinking time too long for practical use. In contrast, too much cross-linking aid tends to make the crosslinking time too short and to deteriorate the sealing properties of the member to be compressed for an electrochemical device.

The above-described crosslinkable composition also preferably contains a filler. Examples of the filler include a metal oxide such as calcium oxide, titanium oxide or aluminum oxide; a metal hydroxide such as magnesium hydroxide, aluminum hydroxide or calcium hydroxide; a carbonate such as magnesium carbonate, aluminum carbonate, calcium carbonate or barium carbonate; a silicate such as magnesium silicate, calcium silicate, sodium silicate or aluminum silicate; a sulfate such as aluminum sulfate, calcium sulfate or barium sulfate; a metal sulfide such as synthetic hydrotalcite, molybdenum disulfide, iron sulfide or copper sulfide; diatomaceous earth, asbestos, lithopone (zinc sulfide/barium sulfide), graphite, carbon black, carbon fluoride, calcium fluoride, coke, quartz fine powder, zinc white (zinc oxide), talc, mica powder, wollastonite, a carbon fiber, an aramid fiber, various whiskers, a glass fiber, an organic reinforcing agent, an organic filler, polytetrafluoroethylene, mica, silica, celite and clay.

The content of the filler in the crosslinkable composition is preferably 0.01 to 50 parts by mass and more preferably 1 to 30 parts by mass, based on 100 parts by mass of the fluorine-containing elastomer.

The crosslinkable composition is preferably obtained by kneading the fluorine-containing elastomer and, if desired, a cross-linking agent, a cross-linking aid, a filler or the like.

The kneading can be carried out by using an open roll mill, a Banbury mixer, a pressure kneader, an extruder or the like, but preferably by using a pressure kneader or an extruder such as a twin-screw extruder because a high shearing force can be applied.

The member to be compressed for an electrochemical device of the present disclosure can be obtained by cross-linking the crosslinkable composition. The member to be compressed for an electrochemical device of the present disclosure can be also produced by molding the crosslinkable composition and crosslinking the obtained molded product or by simultaneously molding and crosslinking.

The molding process is not limited, and examples thereof include compression molding, extrusion molding, transfer molding and injection molding. The member to be compressed for an electrochemical device of the present disclosure can be produced with high productivity even by a molding process using a mold, because it is excellent in releasability at the time of molding.

The crosslinking can be carried out, for example, by a conventional method such as a method of heating and compressing with a mold, a method of press fitting into a heated mold, or a method of extruding with an extruder followed by crosslinking. The crosslinking is also carried out in the order of primary crosslinking and finally secondary crosslinking to obtain the member to be compressed for an electrochemical device of the present disclosure.

For the primary crosslinking conditions, the crosslinking is preferably carried out at 150 to 230° C. for 5 to 120 minutes, more preferably 150 to 200° C. for 5 to 90 minutes, and particularly preferably at 160 to 190° C. for 10 to 60 minutes. The crosslinking means may be any known cross-linking means, and examples thereof include press cross-linking.

For the secondary crosslinking conditions, the crosslinking is preferably carried out at 160 to 320° C. for 2 to 168 hours and more preferably at 180 to 310° C. for 4 to 36 hours. The crosslinking means may be any known cross-linking means, and examples thereof include oven cross-linking.

The size and shape of the member to be compressed for an electrochemical device of the present disclosure may be appropriately set depending on the intended use, and is not limited. The shape of the member to be compressed for an electrochemical device of the present disclosure may be, for example, an annular shape. Further, the member to be compressed for an electrochemical device of the present disclosure may have such a shape as a circle, an oval, or a rounded rectangle in planar view, and may have a through hole in the central portion thereof.

The member to be compressed for an electrochemical device of the present disclosure is a member that constitutes an electrochemical device and is used by compressing to deforming it. The electrochemical device is not limited as long as it is a device in which switching is carried out between electrical energy and chemical energy. Examples of the electrochemical device include a battery such as a lithium-ion secondary battery, a lithium-ion capacitor, a hybrid capacitor, an electric double layer capacitor and an aluminum electrolytic capacitor. The electrochemical device is preferably a lithium-ion secondary battery and a lithium-ion capacitor. Examples of the constituent member of the electrochemical device include a sealing member for an electrochemical device and an insulating member for an electrochemical device.

The member to be compressed for an electrochemical device of the present disclosure can be suitably used, for example, as a sealing member such as a sealing gasket or a sealing packing, and an insulating member such as an insulating gasket or an insulating packing. The sealing member is a member used to prevent liquid or gas from leaking out or to prevent liquid or gas from intruding from the outside. The insulating member is a member used to insulate electricity. The members to be compressed for an electrochemical device of the present disclosure may be a member used for both sealing and insulating.

The member to be compressed for an electrochemical device of the present disclosure can be suitably used as a member to be compressed for a battery, and particularly suitably used as a member to be compressed for a secondary battery, because it is excellent in sealing properties and electrolyte resistance.

The member to be compressed for an electrochemical device of the present disclosure has excellent resistance (electrolyte resistance) to an electrolyte used in a non-aqueous electrolyte secondary battery. Therefore, the member to be compressed for an electrochemical device of the present disclosure can be suitably used as a member to be compressed for a non-aqueous electrolyte secondary battery, and particularly suitably as a member to be compressed for a non-aqueous electrolyte lithium-ion secondary battery.

The non-aqueous electrolyte secondary battery comprises a positive electrode plate (positive electrode sheet), a separator, a negative electrode plate (negative electrode sheet), a battery case, a sealing body and a gasket. Examples of the non-aqueous electrolyte secondary battery include a non-aqueous electrolyte secondary battery comprising, as the gasket, the member to be compressed for an electrochemical device of the present disclosure.

The non-aqueous electrolyte secondary battery comprises, for example, a battery case having an opening; a positive electrode plate, a separator, a negative electrode plate and a non-aqueous electrolytic solution housed in the battery case; and a sealing body for sealing the opening of the battery case. The battery case and the sealing body are sealed with a gasket. The sealing body may double as an external connection terminal (positive electrode terminal or negative electrode terminal).

Further, the non-aqueous electrolyte secondary battery comprises, for example, a battery case having an opening; a positive electrode plate, a separator, a negative electrode plate and a non-aqueous electrolytic solution housed in the battery case; and a sealing body for sealing the opening of the battery case. The sealing body is provided with an electrode terminal (a positive electrode terminal or a negative electrode terminal) that is electrically connected to the electrode plate (positive electrode plate or negative electrode plate). The sealing body and the electrode terminal are sealed with a gasket.

Sealing with the gasket prevents the non-aqueous electrolytic solution from leaking out and also prevents water from infiltrating into the inside of the non-aqueous electrolyte secondary battery. In addition, sealing with the gasket insulates between the positive electrode terminal and the negative electrode terminal to prevent a short circuit between the terminals. Therefore, the gasket is required to have insulating properties as well as a low compression set rate and an excellent electrolyte resistance.

In the non-aqueous electrolyte secondary battery comprising the member to be compressed for an electrochemical device of the present disclosure, the member to be compressed for an electrochemical device is used as a gasket to seal the members from each other. The member to be compressed for an electrochemical device of the present disclosure has insulating properties as well as a low compression set rate and an excellent electrolyte resistance. Therefore, according to the non-aqueous electrolyte secondary battery, the insulating properties are maintained for a long period of time, and the leakage of the non-aqueous electrolytic solution and the infiltration of water from the outside is not easy to occur and are prevented for a long period of time.

The electrolytic solution used in the non-aqueous electrolyte secondary battery preferably contains a solvent. The content of the solvent in the electrolytic solution is preferably 70 to 99.999% by mass, more preferably 80% by mass or more, and more preferably 92% by mass or less.

The solvent preferably contains at least one selected from the group consisting of a carbonate and a carboxylic acid ester. The carbonate may be a cyclic carbonate or a chain carbonate.

The cyclic carbonate may be a non-fluorinated cyclic carbonate or a fluorinated cyclic carbonate.

The non-fluorinated saturated cyclic carbonate is preferably at least one selected from the group consisting of ethylene carbonate, propylene carbonate, cis-2,3-pentylene carbonate, cis-2,3-butylene carbonate, 2,3-pentylene carbonate, 2,3-butylene carbonate, 1,2-pentylene carbonate, 1,2-butylene carbonate and butylene carbonate.

The fluorinated cyclic carbonate may be a fluorinated saturated cyclic carbonate or a fluorinated unsaturated cyclic carbonate.

The fluorinated saturated cyclic carbonate is a saturated cyclic carbonate having a fluorine atom, and specific examples thereof include a compound represented by the following general formula (A):

(A)

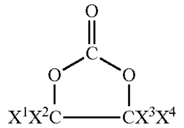

wherein $X^1$ to $X^4$ are the same or different, and each of $X^1$ to $X^4$ represents —H, —$CH_3$, —$C_2H_5$, —F, a fluorinated alkyl group optionally having an ether bond, or a fluorinated alkoxy group optionally having an ether bond, provided that at least one of $X^1$ to $X^4$ is —F, a fluorinated alkyl group optionally having an ether bond, or a fluorinated alkoxy group optionally having an ether bond. The fluorinated alkyl group is —$CF_3$, —$CF_2H$, —$CH_2F$ or the like.

The chain carbonate may be a non-fluorinated chain carbonate or a fluorinated chain carbonate.

Examples of the non-fluorinated chain carbonate include a hydrocarbon-based chain carbonate such as $CH_3OCOOCH_3$ (dimethyl carbonate: DMC), $CH_3CH_2OCOOCH_2CH_3$ (diethyl carbonate: DEC), $CH_3CH_2OCOOCH_3$ (ethyl methyl carbonate: EMC), $CH_3OCOOCH_2CH_2CH_3$ (methyl propyl carbonate), methyl butyl carbonate, ethyl propyl carbonate, ethyl butyl carbonate, dipropyl carbonate, dibutyl carbonate, methyl isopropyl carbonate, methyl-2-phenylphenyl carbonate, phenyl-2-phenylphenyl carbonate, trans-2,3-pentylene carbonate, trans-2,3-butylene carbonate and ethyl phenyl carbonate. Among them, preferred is at least one selected from the group consisting of ethyl methyl carbonate, diethyl carbonate and dimethyl carbonate.

Examples of the fluorinated chain carbonate include a compound represented by the general formula (B):

$$Rf^2OCOOR^7 \quad (B)$$

wherein $Rf^2$ is a fluorinated alkyl group having 1 to 7 carbon atoms, and $R^7$ is an alkyl group having 1 to 7 carbon atoms and optionally containing a fluorine atom.

$Rf^2$ is a fluorinated alkyl group having 1 to 7 carbon atoms, and $R^7$ is an alkyl group having 1 to 7 carbon atoms and optionally containing a fluorine atom. The fluorinated alkyl group is an alkyl group in which at least one hydrogen atom is replaced by a fluorine atom. When $R^7$ is an alkyl group containing a fluorine atom, it is a fluorinated alkyl group.

The chain carboxylic acid ester may be a non-fluorinated chain carboxylic acid ester or a fluorinated chain carboxylic acid ester.

The above-described solvents may be used singly or in any combination of two or more at any ratio.

When the solvent contains the cyclic carbonate and at least one selected from the group consisting of the chain carbonate and the chain carboxylic acid ester, it preferably contains a total of 10 to 100% by volume, more preferably 30 to 100% by volume and still more preferably 50 to 100% by volume of the cyclic carbonate and at least one selected from the group consisting of the chain carbonate and the chain carboxylic acid ester.

The electrolytic solution used in the non-aqueous electrolyte secondary battery preferably further contains an electrolyte salt. The electrolyte salt may be a lithium salt, an ammonium salt and a metal salt as well as any salt that can be used in the electrolytic solution, such as a liquid salt (an ionic liquid), an inorganic polymeric salt or an organic polymeric salt.

The electrolyte salt of the electrolytic solution for a lithium-ion secondary battery is preferably a lithium salt.

The lithium salt may be any lithium salt and specific examples thereof include the following. For example, preferred is at least one lithium salt selected from the group consisting of $LiPF_6$, $LiN(FSO_2)_2$ and $LiBF_4$.

These electrolyte salts may be used singly or in combination of two or more. A preferable example of the combination of two or more electrolyte salts is a combination of $LiPF_6$ and $LiBF_4$, or a combination of $LiPF_6$ and $LiPO_2F_2$, $C_2H_5OSO_3Li$ or $FSO_3Li$, which has the effect of improving high temperature storage characteristics, load characteristics and cycle characteristics.

In this case, the formulation amount of $LiPF_6$, $LiN(FSO_2)_2$, $LiBF_4$, $LiPO_2F_2$, $C_2H_5OSO_3Li$ or $FSO_3Li$ based on 100% by mass of the entire electrolytic solution is not limited and is any amount that does not significantly impair the effects of the present disclosure, but it is usually 0.01% by mass or more and preferably 0.1% by mass or more, and usually 30% by mass or less, preferably 20% by mass or less, more preferably 10% by mass or less and still more preferably 5% by mass or less, based on the electrolytic solution.

The concentration of each of these electrolyte salts in the electrolytic solution is not limited. The total molar concentration of lithium in the electrolytic solution is preferably 0.3 mol/L or more, more preferably 0.4 mol/L or more and still more preferably 0.5 mol/L or more, and preferably 3 mol/L or less, more preferably 2.5 mol/L or less and still more preferably 2.0 mol/L or less, from the viewpoint of ensuring a good battery performance by keeping the electrical conductivity of the electrolytic solution in a good range.

The embodiments have been described above, but it will be understood that various modifications of the embodiments and details can be made without departing from the sprit and scope of the claims.

EXAMPLES

The embodiments of present disclosure will be now described with reference to Examples, but the present disclosure is not limited to only such examples.

Each of the numerical values shown in the Example was measured by the following method.

<Compositional Analysis>

The measurement was carried out using $^{19}F$-NMR.

Measurement device: VNMRS400, manufactured by Varian Medical Systems, Inc.

Resonance frequency: 376.04 (Sfrq)

Pulse width: 30° (pw=6.8)

<Iodine Atom Content Rate and Bromine Atom Content Rate>

The iodine atom content rate and bromine atom content rate was determined using a Shinadzu 20A ion chromatograph, after mixing 12 mg of a fluorine-containing elastomer with 5 mg of $Na_2SO_3$, subjecting it to combustion in oxygen in a quartz flask followed by absorption in an absorbing solution, that is, 30 mg of a mixture of $Na_2CO_3$ and $K_2CO_3$ in a ratio of 1:1 (weight ratio) dissolved in 20 ml of pure water, and then allowing it to stand for 30 minutes. Calibration curves can be prepared using KI standard solutions and KBr standard solutions, solutions containing 0.5 ppm and 1.0 ppm of an iodine ion and a bromine ion.

<Glass Transition Temperature (Tg)>

The glass transition temperature was determined by using a differential scanning calorimeter (DSC822e, manufactured by Mettler Toledo), heating 10 mg of a sample at a heating rate of 20° C./min to obtain a DSC curve, and reading out, as a glass transition temperature, the temperature at the midpoint between two points of intersection between the extended lines of the baselines after and before secondary transition of the DSC curve and the tangent line at the inflection point of the DSC curve.

<Mooney Viscosity (ML (1+10) 121° C.)>

Mooney viscosity was measured in accordance with ASTM-D1646 and JIS K6300.

Measurement device: an automatic Mooney viscometer, manufactured by Ueshima Seisakusho Co., Ltd.

Rotor speed: 2 rpm

Measurement temperature: 121° C.

<Weight Average Molecular Weight (Mw), Number Average Molecular Weight (Mn) and Molecular Weight Distribution (Mw/Mn)>

The measurement was made under the following conditions with the following device.

Device: HLC-8020 (manufactured by Tosoh Corporation)

Columns: two GPC KF-806M
 one GPC KF-801
 one GPC KF-802

Detector: Differential refractometer

Developing solvent: Tetrahydrofuran

Temperature: 35° C.

Sample concentration: 0.1% by weight

Standard sample: Various monodisperse polystyrenes ((Mw/Mn)=1.14 (max)), TSK Standard Polystyrene (manufactured by Tosoh Corporation)

<Storage Elastic Modulus>

The dynamic viscoelasticity test with a rubber process analyzer (model: RPA2000), manufactured by Alpha Technologies Ltd, in accordance with ASTM D6204. The storage elastic modulus G' was measured at a strain amplitude of 0.5 Deg and a frequency of 100 CPM at temperatures of 100° C. and 180° C.

<Crosslinking Characteristics>

The crosslinking curve of the crosslinkable composition was obtained using a rheometer (MDRH2030, manufactured by M&K Co. Ltd.) under conditions of 160° C. for 10 minutes. The minimum viscosity (ML), maximum viscosity (MH), the induction time (T10) and the optimum crosslinking time (T90) were determined from the change in torque.

<100% Modulus (M100)>

The crosslinkable composition was subjected to primary crosslinking at 160° C. for 10 minutes and then to secondary crosslinking at 180° C.for 4 hours to obtain a sheet having a thickness of 2 mm and make a measurement in accordance with JIS-K6251.

<Tensile Breaking Strength (Tb) and Tensile Breaking Elongation (Eb)>

The crosslinkable composition was subjected to primary crosslinking at 160° C. for 10 minutes and then to secondary crosslinking at 180° C. for 4 hours to obtain a sheet having a thickness of 2 mm and make a measurement in accordance with JIS-K6251.

<Hardness>

The crosslinkable composition was subjected to primary crosslinking at 160° C. for 10 minutes and then to secondary crosslinking at 180° C. for 4 hours to obtain a sheet having a thickness of 2 mm and measure its hardness (PEAK value) in accordance with JIS-K6253.

<Compression Set>

The compression set of an O-ring having a nominal diameter of P-24 specified in JIS-B2401 was determined in accordance with JIS-K6262. Specifically, the O-ring after the secondary crosslinking obtained in each of the following Examples and Comparative Examples was held in a compressed state under a 25%-increased pressure at 200° C. for 72 hours and the pressure then was released. The O-ring was allowed to stand in a temperature-controlled room at 25° C. for 30 minutes, and its thickness was then measured to determine its compression set. In addition, the O-ring after the secondary crosslinking obtained in each of the following Examples and Comparative Examples was held in a compressed state under a 25% increased pressure at 200° C. for 72 hours followed by at −30° C. for 72 hours, and the pressure then was released. The thickness of the O-ring, which remained at a low temperature, was measured to determine the compression set. This was described as "Compression set (cycle)" in Table 2.

<Releasability>

A mold having cavities capable of preparing 65 O-rings at a time was placed in a vacuum press, the chamber was degassed, and the mold was then filled with a crosslinkable composition. The filled crosslinkable composition was pressed at a pressure of 10 MPa and was subjected to primary crosslinking at 160° C. for 7 minutes to obtain an O-ring sheet. The obtained O-ring sheet was then removed from the mold. These operations were repeated a total of three times with applying no mold release agent. The mold used for molding three times and the O-ring sheet obtained after the third molding were observed to evaluate the releasability according to the following criteria.

○: Few stains due to burrs and deposits on the upper and lower surfaces of the mold, and few O-rings having molding defects x: Many torn O-ring sheet and many stains due to burrs, and pronounced molding defects such as cracks and dents.

The fluorine-containing elastomers shown in Table 1 were used in Examples and Comparative Examples.

TABLE 1

| | | | Fluorine-containing elastomer | | | | | | | | |
|---|---|---|---|---|---|---|---|---|---|---|---|
| | | | 1 | 2 | 3 | 4 | 5 | 6 | 7 | 8 | 9 |
| Compositional features | VdF | mol % | 67.6 | 73.7 | 73.5 | 68.1 | 71.4 | 56.6 | 67.0 | 51.4 | 50.1 |
| | TFE | mol % | 12.4 | 8.3 | 9.1 | 12.5 | 10.1 | 26.1 | 14.7 | 21.9 | 19.8 |
| | PMVE | mol % | 20.0 | 18.0 | 17.4 | 19.4 | 18.5 | | | | |
| | MOVE | mol % | | | | | | 17.3 | | | |
| | PMPVE | mol % | | | | | | | 18.3 | | |
| | HFP | mol % | | | | | | | | 26.6 | 30.0 |
| Iodine atom content rate | | % by mass | 0.40 | 0.31 | 0.42 | 0.32 | — | 0.24 | — | 0.25 | 0.16 |
| Bromine atom content rate | | % by mass | — | — | — | — | 0.11 | — | 0.16 | — | — |
| Glass transition temperature | | ° C. | −28.3 | −30.3 | −30.6 | −29.9 | −30.1 | −40.0 | −39.5 | −4.0 | −3.4 |
| Mooney viscosity (ML(1 + 10)121° C.) | | | 27 | 43 | 19 | 52 | 30 | 45 | 100 | 31 | 56 |
| Weight average molecular weight ($\times 10^4$) | | | 15.1 | 20.5 | 30.3 | 49.6 | 78.9 | 89.3 | — | 9.5 | 13.8 |
| Number average molecular weight ($\times 10^4$) | | | 10.1 | 11.5 | 8.7 | 13.2 | 12.1 | 7.7 | — | 6.8 | 8.9 |
| Molecular weight distribution (Mw/Mn) | | | 1.5 | 1.8 | 3.5 | 3.8 | 6.5 | 11.6 | — | 1.4 | 1.6 |
| δG'(G'(100° C.)-G'(180° C.)) | | kPa | 138 | 172 | 94 | 160 | 116 | 110 | 84 | 178 | 277 |

The abbreviations shown in Table 1 represent the following monomers, respectively.

VdF: Vinylidene Fluoride

TFE: Tetrafluoroethylene

PMVE: $CF_2{=}CFOCF_3$

MOVE: $CF_2{=}CFOCF_2OCF_3$

PMPVE: $CF_2{=}CFOCF_2CF_2CF_2OCF_3$

HFP: Hexafluoropropylene

The molecular weight was not measured for a fluorine-containing elastomer 7, because it was insoluble in tetrahydrofuran.

Example 1

A crosslinkable composition was prepared by kneading 100 parts by mass of a fluorine-containing elastomer 1, 20 parts by mass of carbon black (Thermax N990, manufactured by Cancarb Limited), 4 parts by mass of triallyl isocyanurate (TAIC, manufactured by Nippon Kasei Chemical Company Limited (presently Mitsubishi Chemical Corporation)) and 1.5 parts by mass of a peroxide (PERHEXA 25B, manufactured by NOF CORPORATION) at 20 to 70° C. using an 8-inch twin-roll mill by a conventional manner.

The obtained crosslinkable composition was molded using a mold capable of preparing a sheet of 2 mm in thickness and a P-24 size O-ring, and was subjected to primary crosslinking at 160° C. for 10 minutes, then removed from the mold, and subjected to secondary crosslinking at 180° C. for 4 hours in an oven to prepare a crosslinked molded product. Table 2 shows the evaluation results of the crosslinkable composition and the crosslinked molded product.

Examples 2 to 7 and Comparative Examples 1 and 2

Each of crosslinkable compositions and each of crosslinked molded products were prepared in the same manner as in Example 1 except that the type of the fluorine-containing elastomer was changed as shown in Table 2. Table 2 shows the evaluation results of each of the crosslinkable compositions and each of the crosslinked molded products.

TABLE 2

| | | Example | | | | | | | Comparative Example | |
|---|---|---|---|---|---|---|---|---|---|---|
| | | 1 | 2 | 3 | 4 | 5 | 6 | 7 | 1 | 2 |
| Formulation of crosslinkable composition | | | | | | | | | | |
| Fluorine-containing elastomer | Type | 1 | 2 | 3 | 4 | 5 | 6 | 7 | 8 | 9 |
| | parts by mass | 100 | 100 | 100 | 100 | 100 | 100 | 100 | 100 | 100 |
| Carbon black | parts by mass | 20 | 20 | 20 | 20 | 20 | 20 | 20 | 20 | 20 |
| Triallyl isocyanurate | parts by mass | 4 | 4 | 4 | 4 | 4 | 4 | 4 | 4 | 4 |
| Peroxide | parts by mass | 1.5 | 1.5 | 1.5 | 1.5 | 1.5 | 1.5 | 1.5 | 1.5 | 1.5 |
| Crosslinking characteristics | | | | | | | | | | |
| ML | dNm | 1.4 | 0.7 | 0.8 | 1.7 | 1.1 | 1.6 | 3.1 | 0.7 | 0.9 |
| MH | dNm | 24.7 | 29.5 | 25.5 | 23.8 | 16.0 | 21.5 | 11.1 | 27.4 | 25.4 |
| T10 | min | 0.9 | 1.1 | 1.0 | 0.9 | 1.1 | 0.9 | 1.1 | 1.1 | 1.2 |
| T90 | min | 2.8 | 3.4 | 3.5 | 2.5 | 5.7 | 2.1 | 5.5 | 3.1 | 3.6 |
| Ordinary physical properties | | | | | | | | | | |
| M100 | MPa | 3.6 | 5.4 | 3.6 | 2.9 | 3.3 | 3.7 | 2.9 | 3.5 | 3.2 |
| Tb | MPa | 20.3 | 21.9 | 19.3 | 24.4 | 18.1 | 17.9 | 12.0 | 22.2 | 22.5 |
| Eb | % | 230 | 250 | 250 | 300 | 270 | 220 | 220 | 290 | 360 |
| Hardness (PEAK) | | 68 | 72 | 65 | 65 | 66 | 62 | 57 | 70 | 70 |
| Releasability | | | | | | | | | | |
| Evaluation of stains on mold or the like (compression molding) | | ○ | ○ | ○ | ○ | — | ○ | — | x | x |

TABLE 2-continued

| | | Example | | | | | | | Comparative Example | |
|---|---|---|---|---|---|---|---|---|---|---|
| | | 1 | 2 | 3 | 4 | 5 | 6 | 7 | 1 | 2 |
| Sealing properties of crosslinked product | | | | | | | | | | |
| Compression set | % | 18 | 21 | 19 | 22 | 35 | 18 | 25 | 21 | 23 |
| Compression set (cycles) | % | 43 | 38 | 37 | 41 | 51 | 27 | 34 | >80 | >80 |

The invention claimed is:

1. A member to be compressed for an electrochemical device obtained by crosslinking a crosslinkable composition containing a fluorine-containing elastomer and a cross-linking aid, wherein the fluorine-containing elastomer exhibits a difference δG' (G'(100° C.)–G'(180° C.)) between a storage elastic modulus G'(100° C.) at a measurement temperature of 100° C. and a storage elastic modulus G'(180° C.) at a measurement temperature of 180° C.in a dynamic viscoelasticity test under a condition of a strain amplitude of 0.5 Deg and a frequency of 100 CPM with a rubber process analyzer satisfying the following conditions:

40 kPa<δG'<175 kPa, wherein the fluorine-containing elastomer contains a vinylidene fluoride unit, a tetrafluoroethylene unit and a perfluoro(alkylvinylether) unit, the fluorine-containing elastomer has a vinylidene fluoride/tetrafluoroethylene/perfluoro(alkylvinylether) molar ratio of 50 to 80/10.1 to 30/15 to 25, and the cross-linking aid is triallyl isocyanurate.

2. The member to be compressed for an electrochemical device according to claim 1, wherein the perfluoro(alkylvinylether) unit is a polymerized unit derived from at least one monomer selected from the group consisting of a perfluoro (alkylvinylether) represented by the general formula (1):

$CF_2{=}CFORf^1$ wherein Rf represents a perfluoroalkyl group having 1 to 8 carbon atoms; and a perfluoro(alkoxyalkylvinylether) represented by the general formula (2):

$CF_2{=}CF(ORf^2)_{k1}ORf^3$ wherein $Rf^2$ represents a perfluoroalkylene group having 1 to 6 carbon atoms, $Rf^3$ represents a perfluoroalkyl group having 1 to 8 carbon atoms or a cyclic perfluoroalkyl group having 5 or 6 carbon atoms, and k1 represents an integer from 1 to 3.

3. The member to be compressed for an electrochemical device according to claim 1, wherein the crosslinkable composition further contains a peroxide cross-linking agent.

4. The member to be compressed for an electrochemical device according to claim 1, which is a member to be compressed for a non-aqueous electrolyte secondary battery.

5. The member to be compressed for an electrochemical device according to claim 1, which is a sealing member or an insulating member.

6. The member to be compressed for an electrochemical device according to claim 1, wherein the fluorine-containing elastomer only consists of the vinylidene fluoride unit, the tetrafluoroethylene unit and the perfluoro (alkylvinylether) unit.

* * * * *